United States Patent
Cassidy et al.

(10) Patent No.: US 7,951,509 B2
(45) Date of Patent: May 31, 2011

(54) COMPLIANT CATHODE CONTACT MATERIALS

(75) Inventors: Mark Cassidy, St. Andrews (GB); Stephen Couse, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 557 days.

(21) Appl. No.: 11/730,555

(22) Filed: Apr. 2, 2007

(65) Prior Publication Data

US 2007/0231676 A1 Oct. 4, 2007

Related U.S. Application Data

(60) Provisional application No. 60/788,043, filed on Apr. 3, 2006, provisional application No. 60/792,614, filed on Apr. 18, 2006.

(51) Int. Cl.
*H01M 4/66* (2006.01)
*H01M 4/64* (2006.01)
*H01M 4/48* (2006.01)
*H01M 8/10* (2006.01)
*H01M 8/24* (2006.01)
*H01M 2/20* (2006.01)
*H01M 2/38* (2006.01)

(52) U.S. Cl. ........ 429/519; 429/458; 429/468; 429/488; 429/495; 429/522

(58) Field of Classification Search ............... 429/12–46, 429/400–535
See application file for complete search history.

(56) References Cited

U.S. PATENT DOCUMENTS

| | | | |
|---|---|---|---|
| 4,755,429 A | 7/1988 | Nickols et al. | |
| 5,453,331 A | 9/1995 | Bloom et al. | |
| 6,492,053 B1 | 12/2002 | Donelson et al. | |
| 6,589,681 B1 | 7/2003 | Yamanis | |
| 2003/0170527 A1 | 9/2003 | Finn et al. | |
| 2003/0180602 A1 | 9/2003 | Finn et al. | |
| 2004/0101742 A1 | 5/2004 | Simpkins et al. | |
| 2004/0200187 A1* | 10/2004 | Warrier et al. | 52/782.1 |
| 2005/0017055 A1 | 1/2005 | Kurz et al. | |
| 2005/0136312 A1* | 6/2005 | Bourgeois et al. | 429/32 |
| 2005/0227134 A1 | 10/2005 | Nguyen | |

OTHER PUBLICATIONS

International Search Report dated Nov. 26, 2008, received in corresponding International application No. PCT/US07/08224.
Haynes International High-Temperature Alloys, "Haynes® 214™ alloy", pp. 1-19.
Haynes International High-Temperature Alloys, "Haynes® 230™ Alloy", pp. 1-27.

* cited by examiner

*Primary Examiner* — Basia Ridley
*Assistant Examiner* — Jonathan G Leong
(74) *Attorney, Agent, or Firm* — The Marbury Law Group, PLLC

(57) ABSTRACT

A solid oxide fuel cell stack includes a plurality of solid oxide fuel cells, wherein each solid oxide fuel cell comprises an electrolyte located between an anode electrode and a cathode electrode, a plurality of gas separators, and at least one compliant cathode contact material. The contact material may be a metallic felt, foam or mesh, an electrically conductive glass or an electrically conductive ceramic felt located between at least one of the plurality of gas separators and a cathode electrode of an adjacent solid oxide fuel cell.

19 Claims, 3 Drawing Sheets

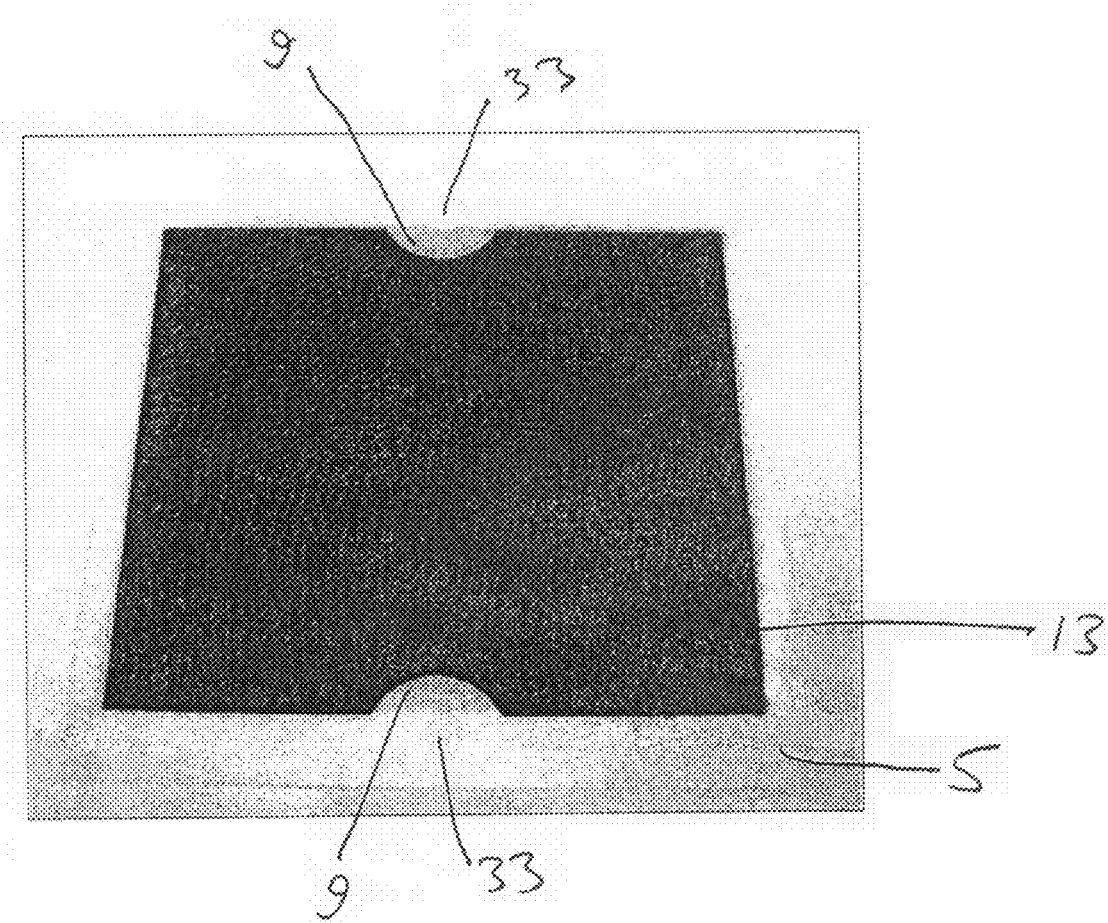

COMPLIANT CATHODE CONTACT MATERIALS

This application claims benefit of priority of U.S. Provisional Application Ser. No. 60/788,043, filed on Apr. 3, 2006 and U.S. Provisional Application Ser. No. 60/792,614, filed on Apr. 18, 2006, both of which are incorporated herein by reference in their entirety.

BACKGROUND

The present invention is directed generally to fuel cells and more particularly to a compliant cathode contact for a fuel cell.

Fuel cells are electrochemical devices which can convert energy stored in fuels to electrical energy with high efficiencies. One type of high temperature fuel cell is a solid oxide fuel cell which contains a ceramic (i.e., a solid oxide) electrolyte, such as a yttria stabilized zirconia (YSZ) electrolyte.

Fuel cell stacks, particularly those with planar geometry, often utilize an electrically conductive contact material to conduct electrons from the anode of one cell to the separator plate, and from the separator plate to the cathode of an adjacent cell. This material typically has a better electrical conductivity than the porous electrode (i.e., anode and/or cathode) material. This contact material may also provide flow distribution of oxygen- or fuel-bearing gases, in which case it may be referred to as a current conductor/gas flow distributor ("conductor/distributor" hereinafter). In some cases, these conductor/distributors may provide structural support to the fuel cell stack. Some examples of prior art conductor/distributors include metal wire coils, wire grids, and metal ribs. These may be used independently or in some combination.

The prior art conductor/distributors sometimes exhibit less-than-optimal current conduction or gas flow distribution properties. They are also costly to implement. Also, many of the prior art conductor/distributors are not compliant (i.e., not elastic at the fuel cell operating temperatures). Non-compliant components often present difficulties and increase costs in fabrication and assembly of the fuel cells due to the tighter fuel cell tolerances which are required.

SUMMARY

A solid oxide fuel cell stack includes a plurality of solid oxide fuel cells, wherein each solid oxide fuel cell comprises an electrolyte located between an anode electrode and a cathode electrode, a plurality of gas separators, and at least one compliant cathode contact material. The contact material may be a metallic felt, foam or mesh, an electrically conductive glass or an electrically conductive ceramic felt located between at least one of the plurality of gas separators and a cathode electrode of an adjacent solid oxide fuel cell.

BRIEF DESCRIPTION OF THE DRAWINGS

FIG. 3 is a three dimensional view of a metal mesh applied to a cathode of a SOFC.

DETAILED DESCRIPTION OF THE PREFERRED EMBODIMENTS

A compliant cathode contact material is arranged between a fuel cell cathode electrode and a gas separator of a fuel cell stack. Any suitable compliant (i.e., elastic at the fuel cell operating temperatures), electrically conductive material which is compatible with the cathode side of fuel cells may be used. The material is preferably elastic and chemically stable at solid oxide fuel cell operating temperatures, such as 700 to 1000° C. and does not itself degrade or cause adverse chemical reactions when placed in contact with electrically conductive ceramics, such as LSM or LSCo, that are used as solid oxide fuel cell cathode electrodes. The compliant material may comprise an electrically conductive glass composite, a metallic felt, or a ceramic felt composite.

A compliant air side (i.e., cathode side) electrical contact is beneficial in solid oxide fuel cell stacks because this materials absorbs movement and stress caused by thermal gradients, CTE mismatches, as well as any vibration type stresses that the stack may experience. Less rigid structures also mean fewer constraints on CTE matching which may allow more materials to be considered for applications where they would have been unsuitable in some prior art stacks.

Compliant layers will also loosen the tolerances currently imposed on many of the stack components. This will mean fewer losses due to tolerance failures, less stringent manufacturing processes and fewer yield failures during both manufacture and stack assembly. This in turn will reduce stack processing costs.

Figure 1:
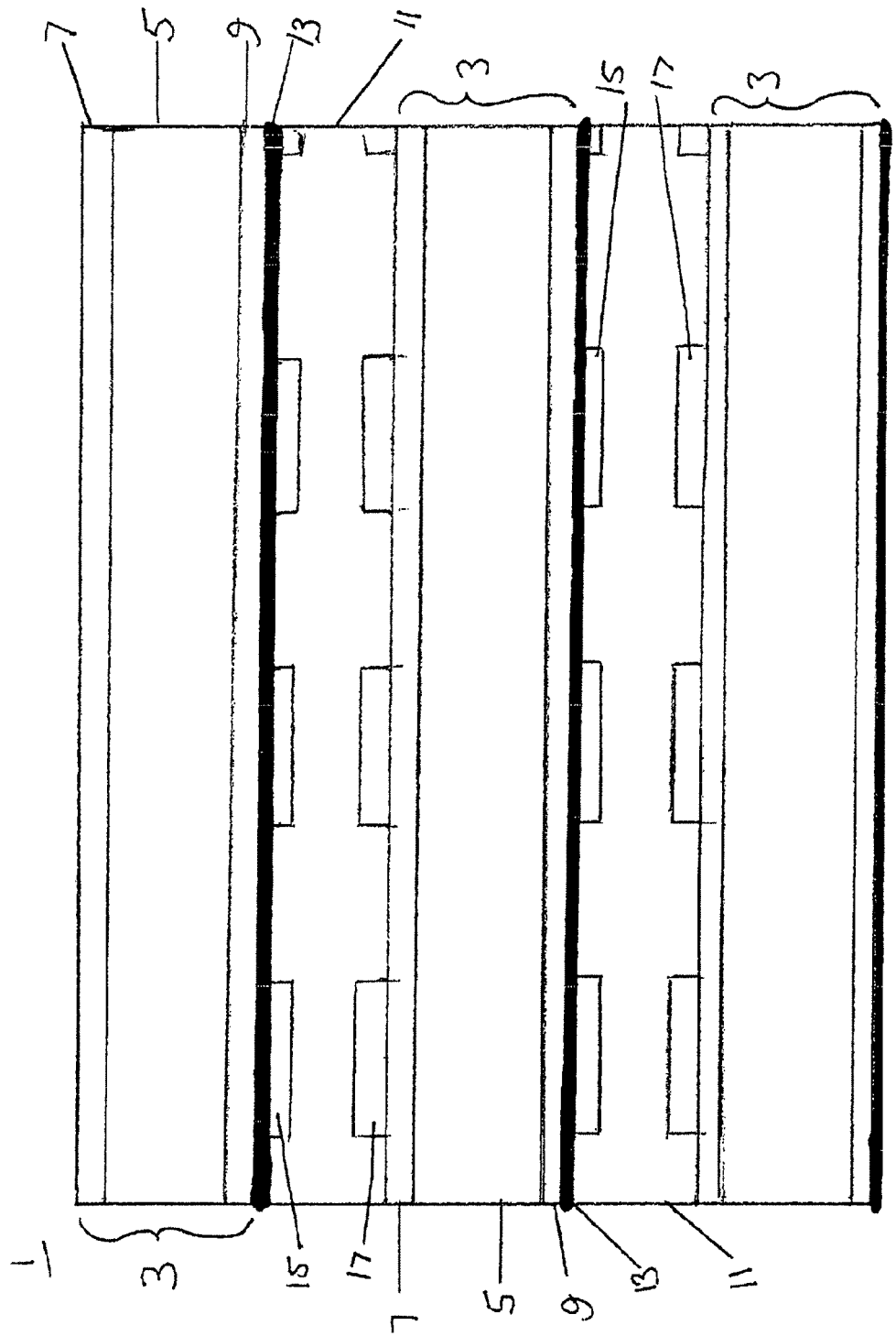
FIGS. 1 and 2 are schematic representations of the repeating elements of a fuel cell stack according to the first and second preferred embodiments, respectively.

FIG. 1 schematically illustrates a solid oxide fuel cell stack 1 of the first embodiment. The stack includes a plurality of fuel cells 3, each of which includes an electrolyte 5 located between anode 7 and cathode 9 electrodes, and a plurality of gas separator plates 11 located between and separating adjacent fuel cells 3. Preferably, the gas separator plate is also used as an interconnect which electrically connects the anode electrode 7 of one cell 3 to a cathode electrode 9 of the adjacent cell. In this case, the gas separator plate which functions as an interconnect is made of an electrically conductive material, such as a metal alloy.

Any suitable materials may be used in the stack. For example, the electrolyte 5 may comprise yttria and/or scandia stabilized zirconia ("YSZ" or "SSZ") or another ionically conductive oxide material, alone or in combination with YSZ. The anode electrode 7 may comprise a cermet, such as Ni—YSZ or Ni—SSZ. The cathode electrode 9 may comprise an electrically conductive ceramic material, such as lanthanum strontium manganite (LSM) or other conductive perovskite materials. The gas separator plate 11 may comprise an electrically conductive ceramic or a metal alloy, such as a chromium-iron alloy.

The stack 1 also contains the compliant cathode contact material 13 which is located between the gas separator plate 11 and the cathode electrode 9 of an adjacent fuel cell 3. The compliant materials will be described in more detail below.

The gas separator plate 11 preferably contains gas flow grooves 15, 17 located in the major surfaces of the separator plate 11 facing the anode and cathode electrodes of adjacent cells. The grooves may be parallel to each other as shown in FIG. 1. Alternatively, the grooves may be perpendicular to each other for cross gas flow on opposite sides of the gas separator plate. Of course, the grooves may extend in any direction between parallel and perpendicular from each other if desired.

It should be noted that the stack 1 shown in FIG. 1, may be oriented upside down or sideways from the exemplary orientation shown in FIG. 1. Furthermore, the thickness of the components of the stack 1 is not drawn to scale or in actual proportion to each other, but is magnified for clarity.

The compliant cathode contact material may be used in a stack in conjunction with a compliant fuel side (i.e., anode side) contact materials, such as a nickel based felt, because it allows degrees of movement every second layer up the height of a stack. While the compliant anode contact material is not shown in FIG. 1, it may be located between the anode electrode 7 and adjacent the gas separator plate/interconnect 11.

Figure 2:
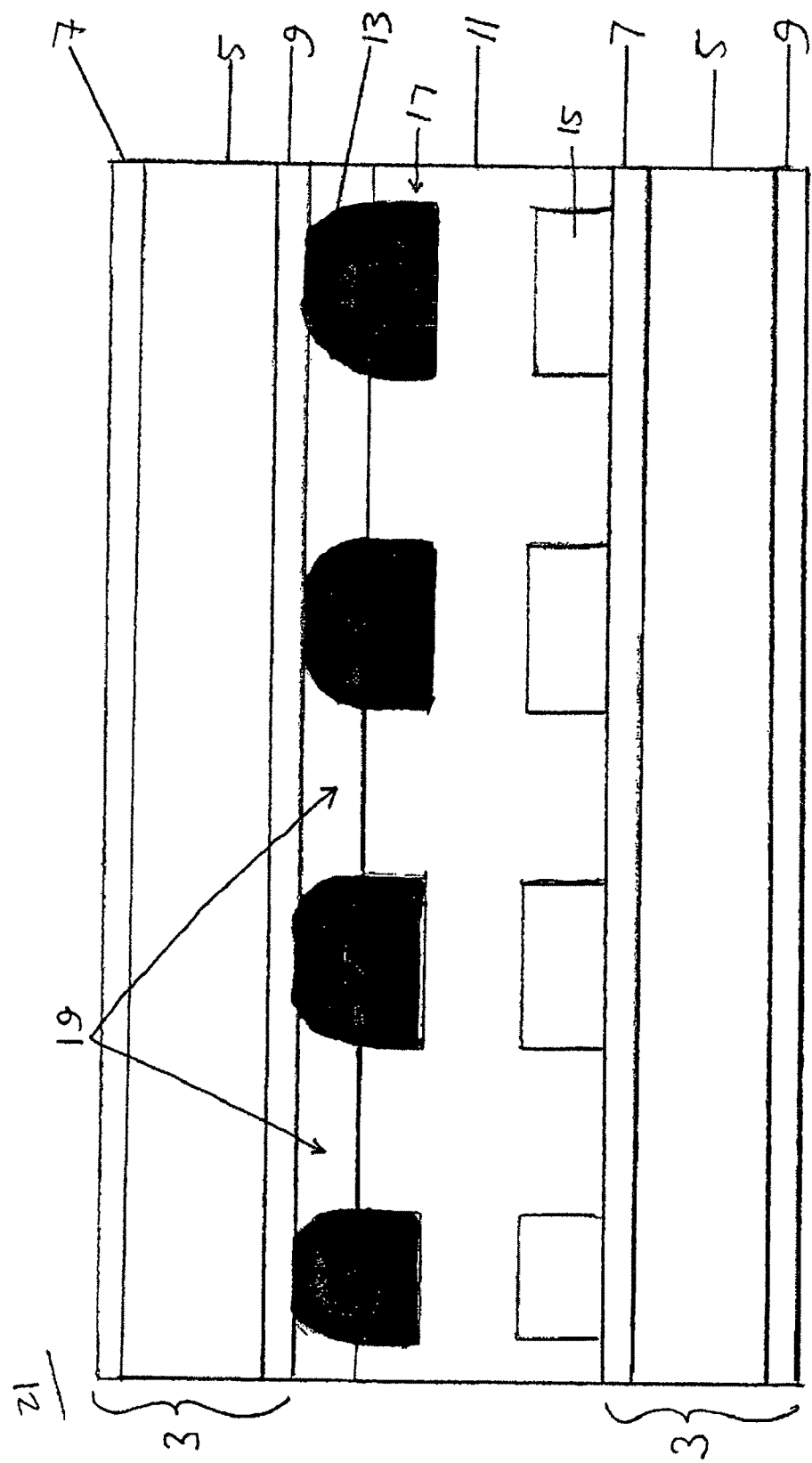

FIG. 2 illustrates a stack 21 according to the second preferred embodiment. In the second embodiment, the compliant cathode contact material 13 is located in the plurality of grooves 17 of the gas separator plate 11. The compliant cathode contact material 13 protrudes from the grooves 17 in the plate 11 to leave gas (i.e., air) flow channels (i.e., openings) 19 located between adjacent protruding portions of the contact material 13. Thus, the channels 19 are bounded by the adjacent protruding portions of the contact material 13, the cathode electrode 9 and the plate 11. If desired, a protruding compliant anode contact material may also be formed in the grooves 15 in plate 11 on the anode side of the fuel cell to form similar fuel flow openings on the fuel or anode side of the fuel cells 3.

The following are descriptions of exemplary compliant cathode contact materials.

Compliant Glass Composite Cathode Contact

In a third embodiment, the compliant cathode contact material 13 comprises a well dispersed percolating network of electrically conducting material dispersed in a glass matrix. Any suitable conducting material and glass matrix may be selected.

For example, the conducting material may comprise a metal, such as silver, gold, nickel, etc., and their alloys, such as high temperature nickel alloys, for example. Alternatively, the conducting material may comprise a conducting ceramic, such as a perovskite ceramic, such as LSM, LSC or LSCo. The ceramic may comprise the same material as the cathode electrode material.

The glass matrix is preferably selected such that it remains soft and compliant in the SOFC operational temperature region (i.e., a high temperature glass). The glass matrix should also have suitable thermomechanical properties, such as glass transition temperature (Tg), melting point and viscoelastic behavior to remain compliant at SOFC operating temperature. A desired attribute for the glass composites is an ability to heal any cracks formed during a thermal cycle when the glass was below its Tg once the composite has returned to a temperature above its Tg. The composite materials should also be chemically compatible with other cell materials to avoid any unwanted chemical interactions.

Another property of the glass matrix is the degree of devitrification exhibited by the glass while at SOFC operating temperature. All glasses will crystallize to some extent. However, the glass should be selected such that the presence of the conducting phase does not provide a significant amount nucleation sites speeding up the crystallization process. This would be a serious issue as it would stiffen the glass, reducing its compliance and the ability to thermally cycle and self heal.

Conductive glass composites have been used before in SOFC systems primarily as a sealant and encapsulating medium to protect the conductive phase and prevent gas leakage. However, it is believed that they were not designed to impart any compliance into the system or to act as a cathode contact material.

The glass matrix material is mixed with a suitable electrical conductive material to form a composite material. The conductive materials is well mixed with the glass matrix material to form a continuous, percolating conductive network, such that the network provides an electrically conductive path from one major surface of the material 13 to the opposite major surface of the material 13 to connect the cathode electrode 9 of one fuel cell to the interconnect/gas separator plate 11. The mixing may be conducted between a glass precursor material powder or powders, such as oxide powders, and a metal powder or fiber material. The glass precursor powders may then be melted to form a glass matrix around the metal conductive phase.

Metallic Compliant Cathode Contact

In a fourth embodiment, a metal felt, foam or mesh is used as the compliant cathode contact. Any suitable felt may be used. Metallic felts are available commercially in a number of high temperature alloys and are commonly used for filtration and flow entrainment of hot gases up to 850° C. The felt should have adequate mechanical and electrical properties at temperatures between room temperature and 900° C. Thus, the felt should not experience large changes in stiffness, electrical conductivity and general degradation with both extended time at operating temperature and during thermal cycling. One example of a metal felt is a Fe—Cr—Al—Y felt with a density of about 5 to 30%, such as about 15% of the solid metal alloy.

Other examples of metal felts, foams and meshes, such as woven meshes, include materials that can withstand the oxidation rates within a high temperature, moist, oxidizing environment without losing its electrical conductivity. The material preferably comprises an oxidation resistant nickel alloy, such as a nickel alloy that contains nickel and one or more of oxidation resistant alloying elements, such as Cr, W, Co and/or Mo.

For example, the felt, foam or mesh alloy may comprise a Haynes 230 alloy foam which has the following composition, in weight percent: 57% Ni, 22% Cr, 14% W, 2% Mo, 3% Fe, 5% Co, 0.5% Mn, 0.4% Si, 0.3% Al, 0.1% C, 0.02% La and 0.015% B.

In general nickel alloys which contain 0 to 35, such as 10 to 30 weight percent Cr, 0 to 25, such as 10 to 20 weigh percent W, 0 to 5 weight percent Mo, 0 to 5, such as 1 to 4 weight percent Co and at least 45, preferably greater than 50 weight percent Ni may be used. Preferably, the alloy contains at least one non-zero weight percentage of Cr, W or Mo. The alloy may also optionally comprise 0 to 5 weight percent Fe and 0 to 1 weight percent of one or more of Mn, Si, Al, C, La and B. For example, other Haynes series 200 alloys may be used.

FIG. 3 illustrates a mesh 13 located on the cathode electrode 9 of a SOFC 3. Fuel inlet and outlet riser openings 33 extending through the SOFC electrolyte 5 are also shown. The felt, foam or mesh 13 may also be provided as a cathode-side insert in a gas separator plate/interconnect 11. The metal felt, foam or mesh may be located in a differently configured interconnect. For example, the interconnect may comprise a monolithic structure rather than an insert-in a gas separator plate design. The metal felt, foam or mesh is electrically conductive, flat, compliant and would allow gas, such as air, to flow though it from the stack inlet to the stack outlet.

For other metal foam, felt or mesh materials exhibiting insufficient oxidation resistance, in order to prevent or reduce potential rapid oxidation of the metallic felt or foam structure leading to embrittlement and eventual mechanical break down of the felt or foam structure, a protective coating of a conductive ceramic material may be applied to the felt, foam or mesh. Preferably, the ceramic material coating is the same as or similar to the cathode electrode ceramic material. For example, the ceramic coating may comprise a conductive perovskite material, such as strontium doped lanthanum manganite (LSM). The formation of this coating may be carried out by infiltrating the felt or foam with a nitrate precursor or with a sol-gel precursor of the ceramic material. A protective coating may be formed on the felt or foam in the region of 400-700° C. during the initial heat up cycle by decomposing the precursor solution to a ceramic oxide protective layer. The ceramic may be coated onto the metal mesh by any suitable deposition methods.

Ceramic Felt Compliant Cathode Contact

In a fifth embodiment, the compliant cathode contact material 13 comprises a well dispersed percolating network of conducting material dispersed in a ceramic matrix. Any suitable conducting material and ceramic matrix may be selected. Preferably, a ceramic felt or paper is used as a compliant matrix. Such felt materials, often based on alumina or zirconia, are widely available and have been used as compliant gas diffusion layers in SOFC test rigs to allow cells to be electrically isolated from the test rig and allow the application of contact pressure by absorbing and distributing the stress field. However these felts are insulating and are impregnated with an electrically conductive phase in order to act as a cathode contact material.

Preferably, the electrically conductive phase comprises a conductive ceramic material. For example, the conductive ceramic material may comprise the same material as the material of the cathode electrode. This material may comprise a conductive perovskite material, such as LSM. Other electrically conductive materials, such as metals, may also be used.

The conductive material is provided or infiltrated into the ceramic matrix material using any suitable method. For example, a nitrate or an alkoxide precursor material may be used to infiltrate LSM or another conductive material into a ceramic felt. The felt is then heated to convert the precursor material into the ceramic oxide.

Alternatively, slurry infiltration may be used to provide a higher level of solids, so that an adequate connection is made between the conductive ceramic particles located an insulating ceramic matrix. In the slurry infiltration method, a well dispersed slurry of a conductive ceramic, such as LSM is forced into the ceramic felt. The infiltrated ceramic felt matrix is dried, and thus becomes loaded with LSM particles. If needed, pressure may be applied to the composite ceramic to force the LSM particles to contact each other such that an acceptable level of electrical conductivity is attained.

The entire disclosure of U.S. patent application Ser. No. 10/369,133 is hereby incorporated by reference in its entirety, including the specification, drawings, abstract and claims. Furthermore, the disclosure of U.S. patent application Ser. No. 10/822,707 is hereby incorporated by reference in its entirety, including the specification, drawings, abstract and claims.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings are not necessarily to scale and illustrate the device in schematic block format. The drawings and description of the preferred embodiments were chosen in order to explain the principles of the invention and its practical application, and are not meant to be limiting on the scope of the claims. It is intended that the scope of the invention be defined by the claims appended hereto, and their equivalents.

What is claimed is:

1. A solid oxide fuel cell stack, comprising:
  a plurality of solid oxide fuel cells, wherein each solid oxide fuel cell comprises an electrolyte located between an anode electrode and a cathode electrode;
  a plurality of gas separators; and
  at least one compliant cathode contact material comprising a metallic felt, a metallic foam, a metallic mesh, an electrically conductive glass or an electrically conductive ceramic felt located between at least one of the plurality of gas separators and a cathode electrode of an adjacent solid oxide fuel cell;
  wherein:
  fuel inlet and outlet riser openings extend through the electrolyte, wherein the cathode electrode is located closer to the fuel inlet and outlet riser openings than the compliant cathode contact material; and
  at least a portion of a major surface of the cathode electrode located adjacent to the fuel inlet and outlet riser is not covered by the at least one compliant cathode contact material.

2. The stack of claim 1, wherein each of the plurality of the gas separators comprises a gas separator plate which is located between adjacent solid oxide fuel cells.

3. The stack of claim 2, further comprising a plurality of the compliant cathode contact materials located between each of the plurality of the gas separator plates and a cathode electrode of an adjacent solid oxide fuel cell.

4. The stack of claim 1, wherein the compliant cathode contact material comprises a metallic felt.

5. The stack of claim 4, wherein the metallic felt is encapsulated in a protective layer of an electrically conductive perovskite ceramic material.

6. The stack of claim 4, wherein the metallic felt comprises an oxidation resistant nickel alloy.

7. The stack of claim 6, wherein the nickel alloy comprises 10 to 30 weight percent Cr, 10 to 20 weight percent W, 0 to 5 weight percent Mo, 0 to 5 weight percent Co, at least 45 weight percent Ni, 0 to 5 weight percent Fe and 0 to 1 weight percent of one or more of Mn, Si, Al, C, La and B.

8. The stack of claim 7, wherein the nickel alloy comprises 57 weight percent Ni, 22 weight percent Cr, 14 weight percent W, 2 weight percent Mo, 3 weight percent Fe, 5 weight percent Co, 0.5 weight percent Mn, 0.4 weight percent Si, 0.3 weight percent Al, 0.1 weight percent C, 0.02 weight percent La and 0.015 weight percent B.

9. The stack of claim 1, wherein the compliant cathode contact material comprises an electrically conductive glass.

10. The stack of claim 9, wherein the electrically conductive glass comprises a well dispersed percolating network of electrically conducting material dispersed in a glass matrix.

11. The stack of claim 1, wherein the compliant cathode contact material comprises a ceramic felt.

12. The stack of claim 11, wherein the ceramic felt comprises a conductive ceramic phase dispersed in an electrically insulating ceramic felt matrix.

13. The stack of claim 2, wherein:
  each of the plurality of a gas separator plates contain a plurality of grooves;
  the compliant cathode contact material is located in the plurality of grooves such that it protrudes from the grooves; and
  air flow channels are located between adjacent protruding portions of the contact material.

14. A solid oxide fuel cell stack, comprising:
  a plurality of solid oxide fuel cells, wherein each solid oxide fuel cell comprises an electrolyte located between an anode electrode and a cathode electrode;
  a plurality of gas separators; and
  at least one compliant cathode contact material comprising a metallic foam or mesh located between at least one of the plurality of gas separators and a cathode electrode of an adjacent solid oxide fuel cell;

wherein:
fuel inlet and outlet riser openings extend through the electrolyte, wherein the cathode electrode is located closer to the fuel inlet and outlet riser openings than the compliant cathode contact material; and at least a portion of a major surface of the cathode electrode located adjacent to the fuel inlet and outlet riser is not covered by the at least one compliant cathode contact material.

15. The stack of claim 14, wherein each of the plurality of the gas separators comprises a gas separator plate which is located between adjacent solid oxide fuel cells.

16. The stack of claim 15, wherein the compliant cathode contact material comprises a metallic foam.

17. The stack of claim 15, wherein the compliant cathode contact material comprises a metallic mesh.

18. The stack of claim 15, wherein the metallic foam or mesh comprises an oxidation resistant nickel alloy.

19. The stack of claim 18, wherein the nickel alloy comprises 10 to 30 weight percent Cr, 10 to 20 weight percent W, 0 to 5 weight percent Mo, 0 to 5 weight percent Co, at least 45 weight percent Ni, 0 to 5 weight percent Fe and 0 to 1 weight percent of one or more of Mn, Si, Al, C, La and B.

* * * * *